(12) United States Patent
Li et al.

(10) Patent No.: US 12,102,202 B2
(45) Date of Patent: Oct. 1, 2024

(54) STORAGE DEVICE FOR DATA ANALYZER FOR AEROSPACE MAGNETIC FIELD MEASUREMENT

(71) Applicant: INSTITUTE OF GEOLOGY AND GEOPHYSICS, CHINESE ACADEMY OF SCIENCES, Beijing (CN)

(72) Inventors: Zhi Li, Beijing (CN); Aimin Du, Beijing (CN); Ying Zhang, Beijing (CN); Lin Zhao, Beijing (CN); Shuquan Sun, Beijing (CN); Xiao Feng, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/022,750

(22) PCT Filed: Aug. 18, 2022

(86) PCT No.: PCT/CN2022/113327
§ 371 (c)(1),
(2) Date: Feb. 23, 2023

(87) PCT Pub. No.: WO2023/226210
PCT Pub. Date: Nov. 30, 2023

(65) Prior Publication Data
US 2024/0277124 A1    Aug. 22, 2024

(30) Foreign Application Priority Data
May 24, 2022   (CN) .......................... 202210566444.6

(51) Int. Cl.
*A45C 15/00*   (2006.01)
*A45C 5/06*   (2006.01)
(Continued)

(52) U.S. Cl.
CPC .............. *A45C 15/00* (2013.01); *A45C 5/065* (2013.01); *A45C 5/14* (2013.01); *A45C 13/005* (2013.01); *A45C 13/02* (2013.01); *A45C 2200/15* (2013.01)

(58) Field of Classification Search
CPC ................ A45C 13/02; A45C 2200/15; A45C 13/005; A45C 5/14; A45C 5/065; A45C 15/00; A47B 2088/4276; E05B 65/44
(Continued)

(56) References Cited

U.S. PATENT DOCUMENTS

| 2,603,500 | A | * | 7/1952 | Messier | ................. | A47B 31/00 |
| | | | | | | 280/30 |
| 5,480,170 | A | * | 1/1996 | Kaiser, II | ............... | A47B 31/02 |
| | | | | | | 280/30 |

(Continued)

FOREIGN PATENT DOCUMENTS

| CN | 204862234 U | 12/2015 |
| CN | 205529612 Y | 8/2016 |

(Continued)

OTHER PUBLICATIONS

ISR of PCT/CN2022/113327.
(Continued)

*Primary Examiner* — Chun Hoi Cheung

(57) ABSTRACT

The present invention pertains to the technical field of aeromagnetic survey, and specifically pertains to a storage device for a data analyzer for aerospace magnetic field measurement, which comprises a storage box body, a moving structure for facilitating movement is connected to the (Continued)

storage box body, a shielding structure for shielding sunlight is connected to the storage box body, an accommodating structure for accommodating an article is connected to the storage box body, a support structure for supporting is connected to the accommodating structure, and a placing structure for placing is connected to the storage box body.

7 Claims, 8 Drawing Sheets

(51) Int. Cl.
    *A45C 5/14*     (2006.01)
    *A45C 13/00*     (2006.01)
    *A45C 13/02*     (2006.01)

(58) Field of Classification Search
    USPC .......................................... 280/30; 206/1.5
    See application file for complete search history.

(56) References Cited

U.S. PATENT DOCUMENTS

| | | | | |
|---|---|---|---|---|
| 5,941,352 | A * | 8/1999 | Lee | A45C 9/00 280/37 |
| 6,129,366 | A * | 10/2000 | Dettmann | A47B 31/00 280/47.35 |
| 6,471,019 | B1 * | 10/2002 | Miller | A45C 15/00 190/111 |
| 6,796,319 | B1 * | 9/2004 | Patarra | A45C 11/20 108/138 |
| 8,256,156 | B1 * | 9/2012 | Burgoyne, Jr. | A45C 11/20 280/7.14 |
| 9,498,055 | B2 * | 11/2016 | Distefano | A47B 13/088 |
| 11,547,190 | B2 * | 1/2023 | DeVeaux | A47B 3/10 |
| 11,649,092 | B2 * | 5/2023 | Mattila | E05C 19/14 220/324 |
| 2004/0201244 | A1 | 10/2004 | Neuer et al. | |
| 2021/0114646 | A1 * | 4/2021 | Hashimoto | B62B 5/025 |
| 2023/0329404 | A1 * | 10/2023 | Crye | A45C 7/0095 |

FOREIGN PATENT DOCUMENTS

| | | |
|---|---|---|
| CN | 105959025 A | 9/2016 |
| CN | 207717065 A | 8/2018 |
| CN | 109057695 A | 12/2018 |
| CN | 109164871 A | 1/2019 |
| CN | 111067289 A | 4/2020 |
| CN | 210349924 A | 4/2020 |
| CN | 210499590 U | 5/2020 |
| CN | 211491458 U | 9/2020 |
| CN | 213308197 U | 6/2021 |
| CN | 213818067 Y | 7/2021 |
| CN | 214621295 Y | 11/2021 |
| CN | 214713500 A | 11/2021 |
| CN | 215552103 U | 1/2022 |
| CN | 114435736 A | 5/2022 |
| CN | 114772049 | 7/2022 |
| EP | 1234777 A | 8/2002 |

OTHER PUBLICATIONS

Luo, Shan et al., Anti-Tipping Design of Cabinet Furniture in Earthquake, Journal of Forestry Engineering, May 25, 2019.

1st Office Action of counterpart Chinese Patent Application No. 202210566444.6 issued on Mar. 17, 2023.

Notice of Allowance of counterpart Chinese Patent Application No. 202210566444.6 issued on Mar. 24, 2023.

\* cited by examiner

STORAGE DEVICE FOR DATA ANALYZER FOR AEROSPACE MAGNETIC FIELD MEASUREMENT

TECHNICAL FIELD

The present invention pertains to the technical field of aeromagnetic survey, and specifically pertains to a storage device for a data analyzer for aerospace magnetic field measurement.

BACKGROUND

Aeromagnetic survey, also known as aeromagnetic prospecting, is the earliest, most mature and most used magnetic survey method in aerogeophysical prospecting method. A data analyzer storage box is provided in the process of aeromagnetic survey. In order to observe a display screen on the data analyzer storage box during outdoor survey, a storage device for a data analyzer for aerospace magnetic field measurement is needed.

At present, the storage box does not have a sunlight shielding function when the storage box is opened. When sunlight irradiates an electronic display screen inside the storage box body, the storage box is easy to reflect light, which is not conducive to observation of the display screen by an observer. When the storage box is provided with universal wheels, the storage box is not easy to be placed on a rough ground, which affects placement of the storage box. When an accommodating box is pulled out, an unstable gravity center is easy to occur, and the accommodating box needs to be manually supported to avoid toppling.

SUMMARY

To address the problems in the prior art, the present invention provides a storage device for a data analyzer for aerospace magnetic field measurement.

The technical scheme used by the present invention to solve the technical problem is as follows: a storage device for a data analyzer for aerospace magnetic field measurement, comprises storage box body, a moving structure for facilitating movement is connected to the storage box body, a shielding structure for shielding sunlight is connected to the storage box body, an accommodating structure for accommodating an article is connected to the storage box body, a support structure for supporting is connected to the accommodating structure, and a placing structure for placing is connected to the storage box body.

The shielding structure comprises fixed shafts, a pair of fixed shafts are rotatably connected to a box cover end of the storage box body, rotating rods are fixedly connected to the fixed shafts, a first torsional spring is butted between the rotating rods and a box cover of the storage box body, a fixed frame is slidably connected to one end of the pair of rotating rods, a sun visor is fixedly connected to the fixed frame, a control block is slidably connected to the box cover end of the storage box body, a first spring is fixedly connected between the control block and the box cover of the storage box body, a ratchet wheel is fixedly connected to the fixed shaft close to one end of the control block, a pawl is rotatably connected inside the box cover of the storage box body, a second torsional spring is butted between the pawl and the storage box body, the pawl butts the ratchet wheel, a butting shaft is fixedly connected to one end of the pawl, one end of the control block butts the butting shaft, the control block takes an "L"-shaped structure, and one end of the control block butting the butting shaft takes a beveled shape.

The accommodating structure comprises an accommodating box, one end of the storage box body is slidably connected to the accommodating box, one end of the accommodating box is slidably connected to a limiting rod, a second spring is fixedly connected between the limiting rod and the accommodating box, one end of the storage box body close to the accommodating box is provided with a limiting groove, one end of the accommodating box is rotatably connected to a pull block, one end of the pull block butts one end of the limiting rod, one end of the limiting rod takes a beveled shape, and the limiting rod can butt the storage box body via the limiting groove.

The support structure comprises a support frame, one end of the accommodating box is slidably connected to the support frame, a pair of tension springs are fixedly connected between the support frame and the accommodating box, a push rod is fixedly connected to a bottom end of the limiting rod, the push rod is slidably connected to the accommodating box, a bottom end of the push rod is fixedly connected to a push block, the push block is slidably connected to the accommodating box, one end of the accommodating box close to the fixed frame is slidably connected to a pair of locking rods, a third spring is fixedly connected between the pair of locking rods, the push block penetrates through the locking rods, the push block butts the locking rods, one end of the locking rods butts the support frame, one end of the locking rods close to the support frame takes a beveled shape, and the support frame takes the shape of "⊏".

Specifically, the moving structure comprises universal wheels, a plurality of universal wheels are mounted on a bottom end of the storage box body, and handles are mounted on both ends of the storage box body.

Specifically, the placing structure comprises support feet, a pair of support feet are rotatably connected inside both ends of the storage box body, a control rod is slidably connected inside both ends of the storage box body, a connecting rod is rotatably connected between the control rod and the support feet, a toggle block is fixedly connected at a top end of the control rod, the toggle block is slidably connected to the storage box body, a fourth spring is fixedly connected between the toggle block and the storage box body, a clamping block is respectively slidably connected at both ends of the storage box body, a fifth spring is fixedly connected between the clamping blocks and the storage box body, a clamping groove is provided at a top end of the toggle block, and the clamping blocks can be in clamping connection with the toggle block via the clamping groove; and the control rod takes a "T"-shaped structure, and one end of the toggle block protrudes from a side wall of the storage box body.

Specifically, the push block takes the shape of "⊏", and one end of the push block butting the locking rods takes a beveled shape.

The present invention achieves the following beneficial effects:

(1) The storage device for a data analyzer for aerospace magnetic field measurement according to the present invention comprises a storage box body, a moving structure for facilitating movement is connected to the storage box body, and a placing structure for placing is connected to the storage box body, the moving structure facilitates the movement of the storage box body, and the placing structure facilitates the placement of the storage box body so as to isolate the storage box body from the ground. In the handling process, two persons cooperate to grasp the handles at both ends of the storage box body so as to carry the storage box body from a vehicle, and the universal wheels facilitate the movement on a flat ground. When it is required to store the data analyzer, the storage box body is lifted, the clamping blocks at both ends of the storage box body are pressed, the fifth spring will be compressed, the clamping blocks will disengage from the clamping groove on the toggle block, the compressed fourth spring will push the toggle block to move downwards, the toggle block will push the "T"-shaped control rod to move downwards, so that the connecting rod is driven to push the support feet to unscrew towards outside of the storage box body; the storage box body is placed on the ground, bottom ends of the support feet will butt the ground, so that the storage box body is supported, thus facilitating the placement on uneven ground and playing a certain function of isolating from the ground. When it is required to move via the universal wheels, the storage box body is lifted, the toggle block is toggled upwards to drive the control rod to move upwards, the connecting rod pulls the support feet to rotate and be accommodated into inside the storage box body, the fourth spring will be compressed, the clamping blocks will enter inside the clamping groove to limit the toggle block, so that the storage box body can be lowered and can move via the universal wheels.

(2) According to the storage device for a data analyzer for aerospace magnetic field measurement of the present invention, a shielding structure for shielding sunlight is connected to the storage box body, and an internal electronic display screen can be shielded by the shielding structure when the storage box body is in use so as to avoid the situation that observation is inconvenient due to direct sunlight; the box cover of the storage box body is opened, the fixed frame is turned outwards to drive the rotating rods and the fixed shafts to rotate, the sun visor will screw out, the first torsional spring will be compressed, the fixed shafts will drive the ratchet wheel to rotate, and the pawl limits one-way rotation of the ratchet wheel under the push of the second torsional spring, thus preventing the rotating rods from rotating under the push of the first torsional spring and retracting to the interior of the box cover of the storage box body; the angle of the sun visor can be adjusted according to needs; the fixed frame is pulled outwards, the fixed frame is slidably connected to one end of the rotating rods, so that a protrusion position of the sun visor can be adjusted; and when the sun visor is not needed, the control block is pressed, the first spring will be compressed, a beveled end of the control block will push the butting shaft to move away from the ratchet wheel direction, thus driving the pawl and the ratchet wheel to disengage, the second torsional spring will be compressed, and the first torsional spring will drive the rotating rods to rotate, thus driving the fixed frame and the sun visor to reset to the interior of the box cover of the storage box body.

(3) According to the storage device for a data analyzer for aerospace magnetic field measurement of the present invention, an accommodating structure for accommodating an article is connected to the storage box body, a support structure for supporting is connected to the accommodating structure, standby components and tools can be accommodated by the accommodating structure, the accommodating structure can be supported by the support structure so as to avoid unstable center of gravity; the pull block is turned outwards, the pull block will push the limiting rod to move downwards, the second spring will be compressed, the top end of the limiting rod will disengage from the limiting groove, and the accommodating box can be pulled out by pulling the accommodating box outwards; a measuring tool can be placed inside the accommodating box, the pull block is released, the limiting rod is reset under the push of the second spring, the support frame is pulled downwards, so that the bottom end of the support frame butts the ground, and the tension springs will extend; when the support frame is pulled to the bottom end and is lower than the locking rods to disengage, the third spring will push the locking rods to protrude, so that the support frame is limited to retract to the interior of the accommodating box, thus supporting the accommodating box and preventing the storage box body from toppling due to unstable center of gravity resulting from the excessively heavy accommodating box; and when the accommodating box is retracted, the pull block is turned outwards, and when the pull block pushes the limiting rod to move downwards, the limiting rod will push the push rod to move downwards, thus driving the "| ⋮ "-shaped push block to move downwards, the beveled end of the push block pushes a pair of locking rods to move towards each other, the third spring will be compressed, the locking rods and the support frame disengage, and the tension springs draw the support frame into the interior of the accommodating box, so that the accommodating box can be pushed into the interior of the storage box body.

BRIEF DESCRIPTION OF THE DRAWINGS

The present invention will now be further described with reference to the accompanying drawings and embodiments.

Figure 1:
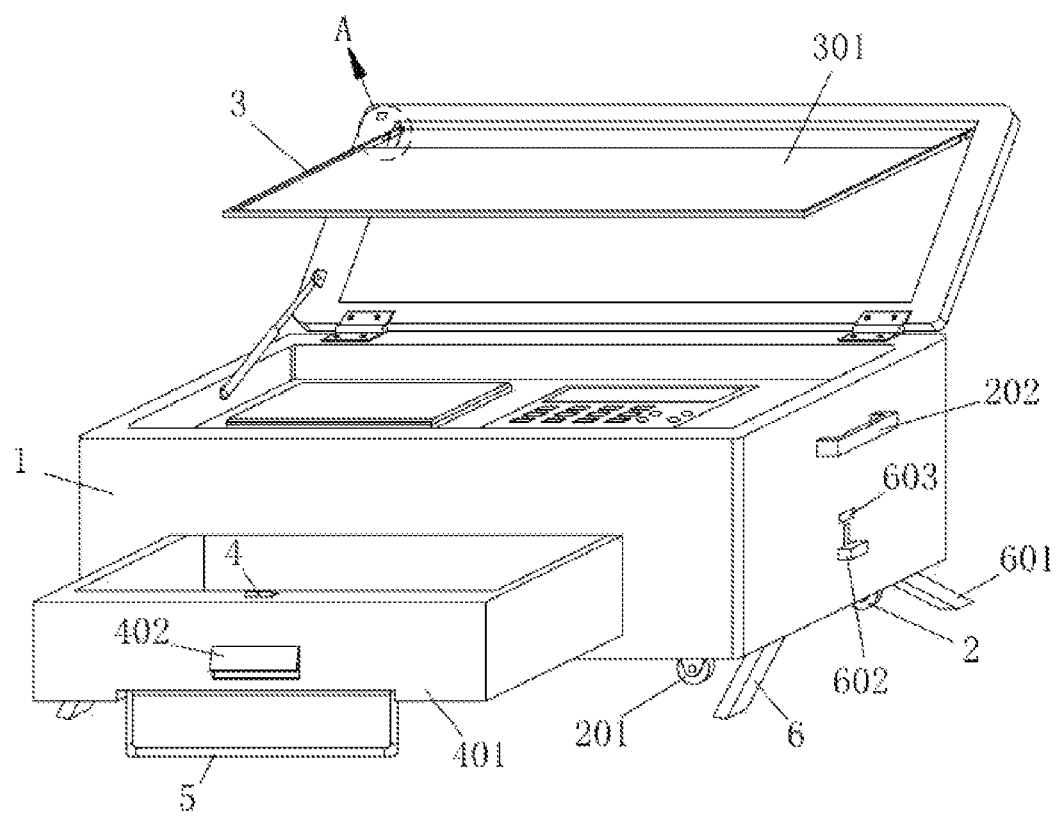
FIG. 1 is an overall structural diagram of a preferred embodiment of a storage device for a data analyzer for aerospace magnetic field measurement according to the present invention.

Reference numerals in the drawings: 1. storage box body; 2. moving structure; 201. universal wheel; 202. handle; 3. shielding structure; 301. sun visor; 302. fixed frame; 303. rotating rod; 304. control block; 305. first torsional spring; 306. fixed shaft; 307. Ratchet wheel; 308. first spring; 309.

pawl; 310. second torsional spring; 311. butting shaft; 4. accommodating structure; 401. accommodating box; 402. pull block; 403. limiting rod; 404. limiting groove; 405. second spring; 5. support structure; 501. support frame; 502. push rod; 503. push block; 504. third spring; 505. tension spring; 506. locking rod; 6. placing structure; 601. support foot; 602. toggle block; 603. clamping block; 604. connecting rod; 605. control rod; 606. fourth spring; 607. fifth spring; 608. clamping groove.

DESCRIPTION OF THE EMBODIMENTS

In order to make the technical means, creative features, achieved purpose and efficacy of the present invention easy to understand, the present invention will be further described with reference to the following embodiments.

Figure 2:
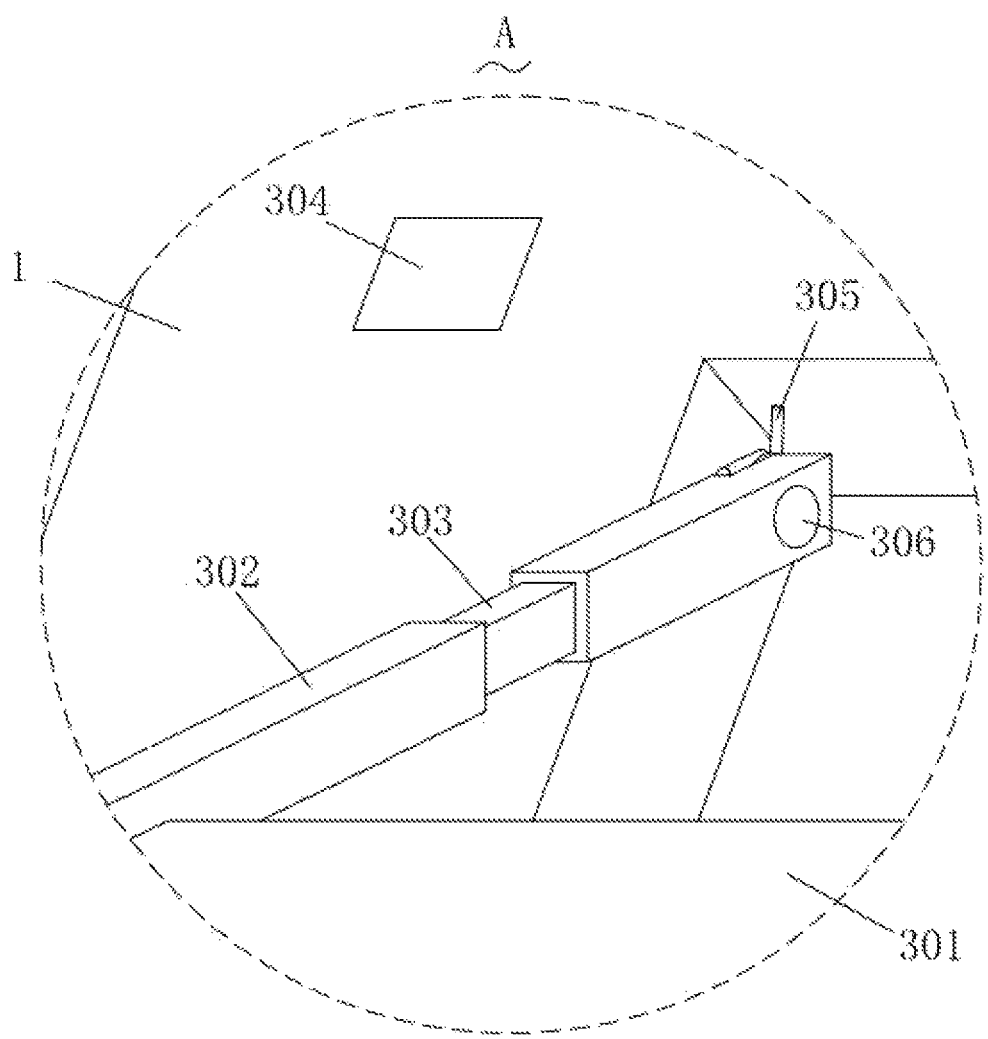
FIG. 2 is a structural enlarged view of a portion A shown in FIG. 1.
Figure 3:
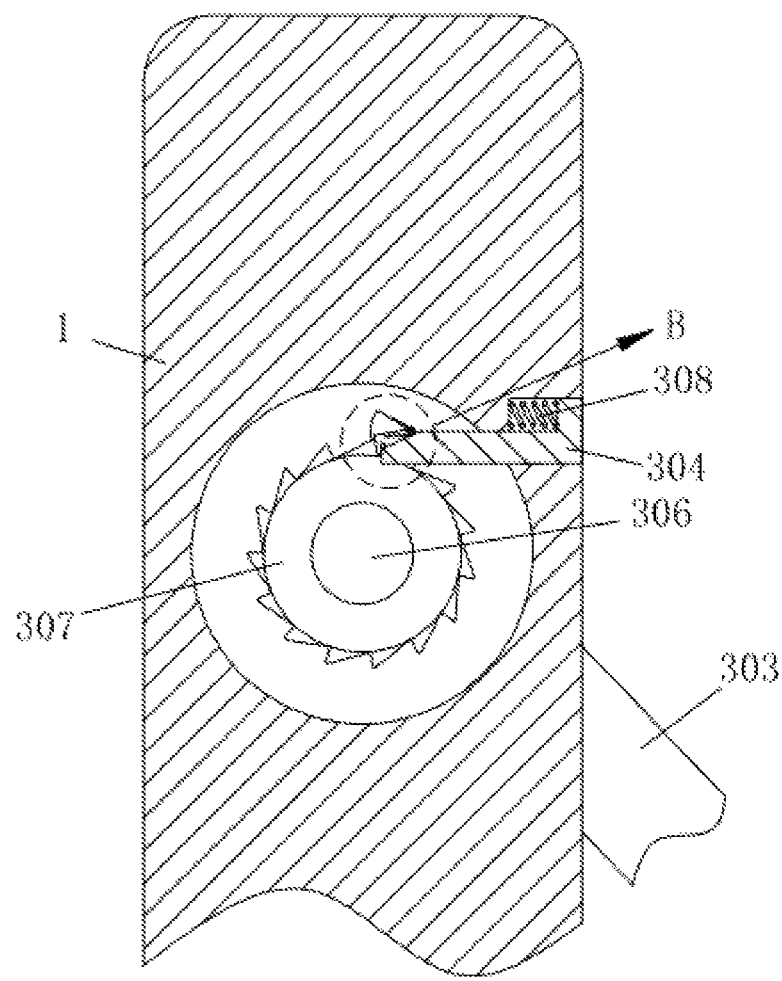
FIG. 3 is a structural diagram of connection between a storage box body and a control block according to the present invention.
Figure 4:
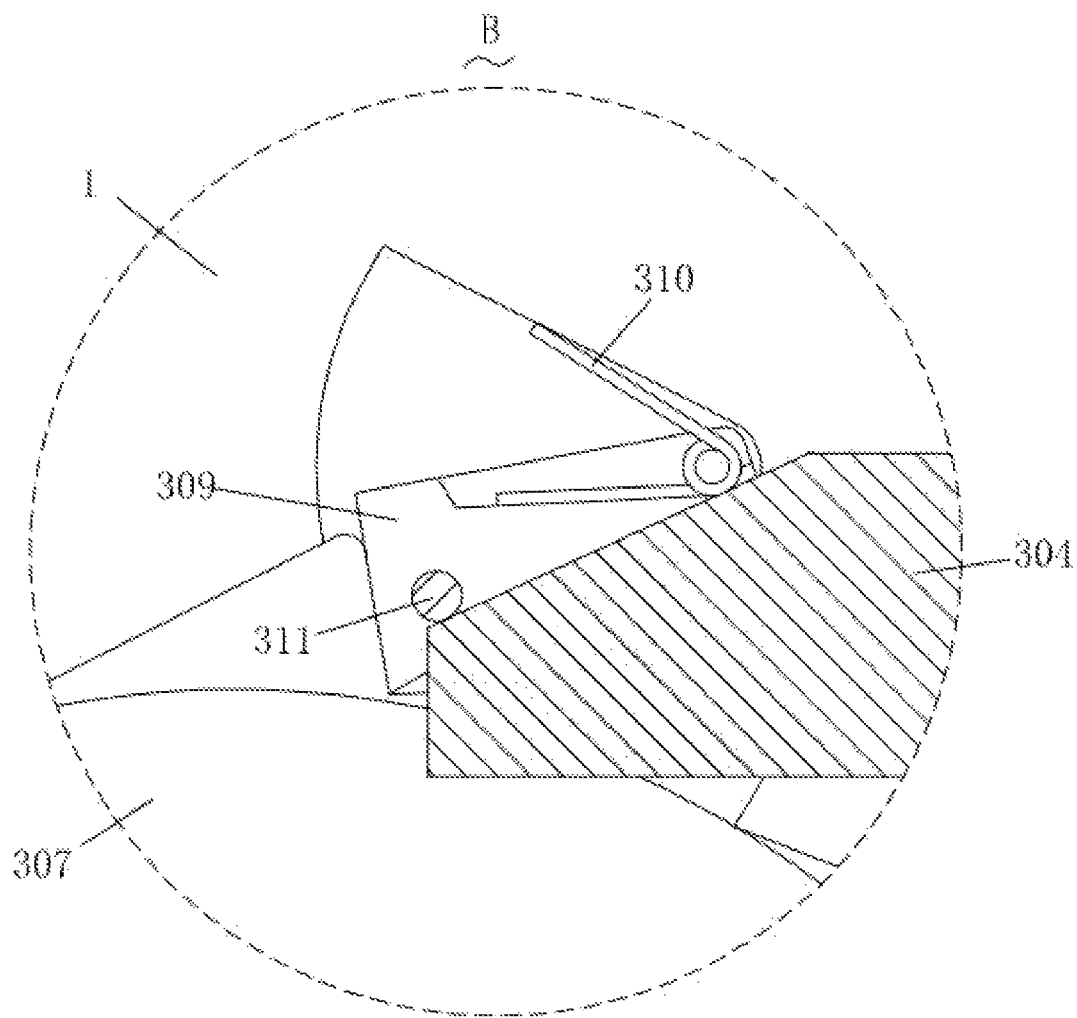
FIG. 4 is a structural enlarged view of a portion B shown in FIG. 3.
Figure 5:
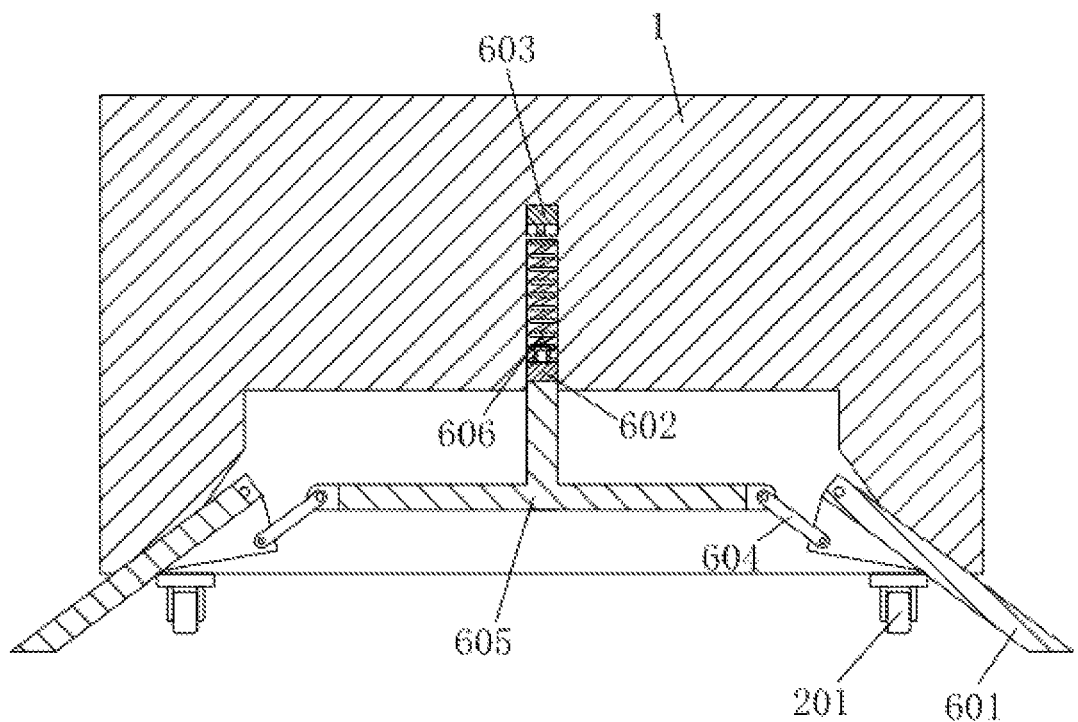
FIG. 5 is a structural diagram of connection between the storage box body and support feet according to the present invention.
Figure 6:
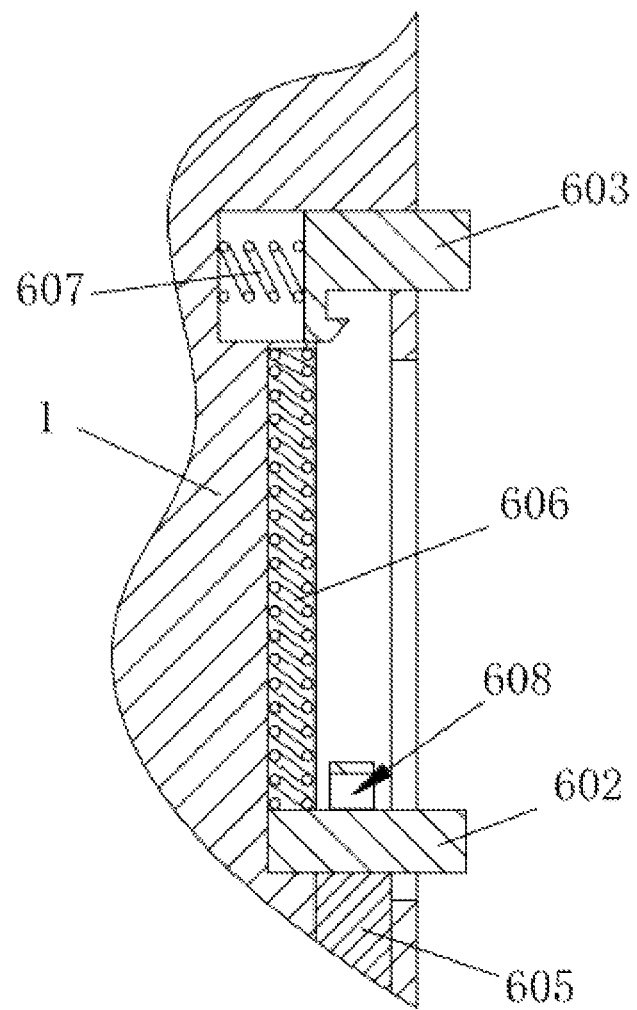
FIG. 6 is a structural diagram of connection between the storage box body and clamping blocks according to the present invention.
Figure 7:
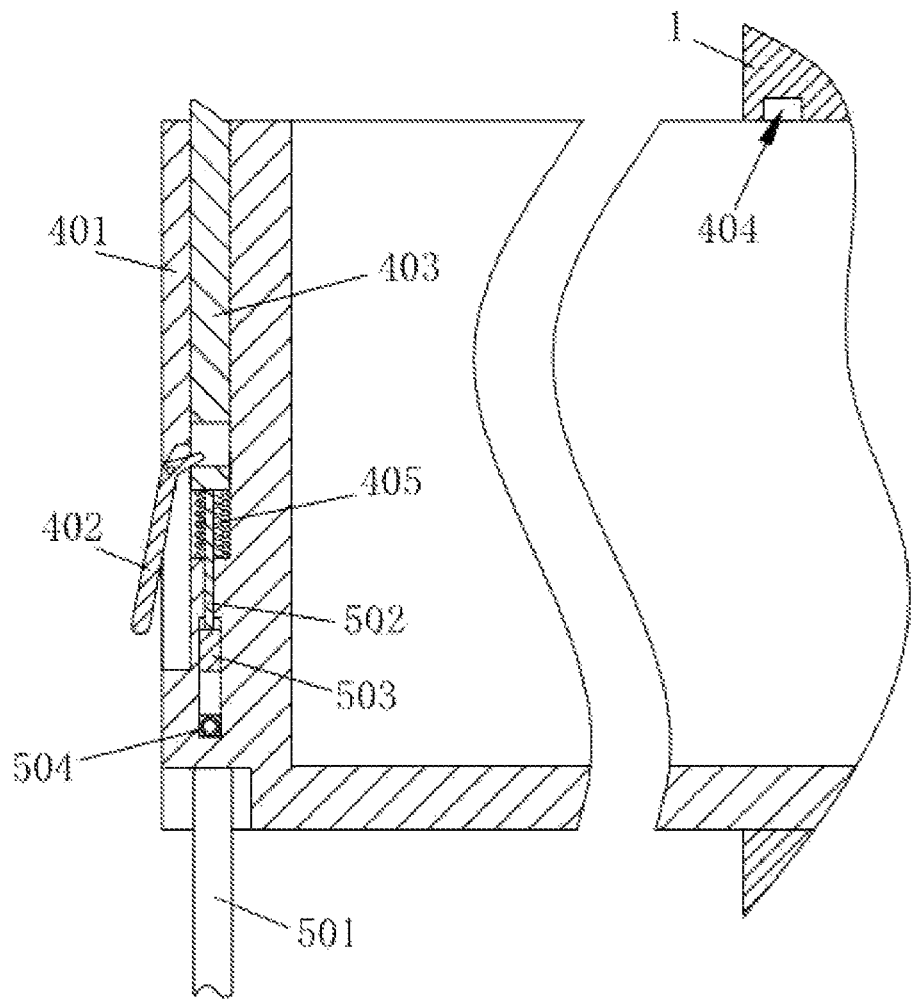
FIG. 7 is a structural diagram of connection between an accommodating box and a limiting rod according to the present invention.
Figure 8:
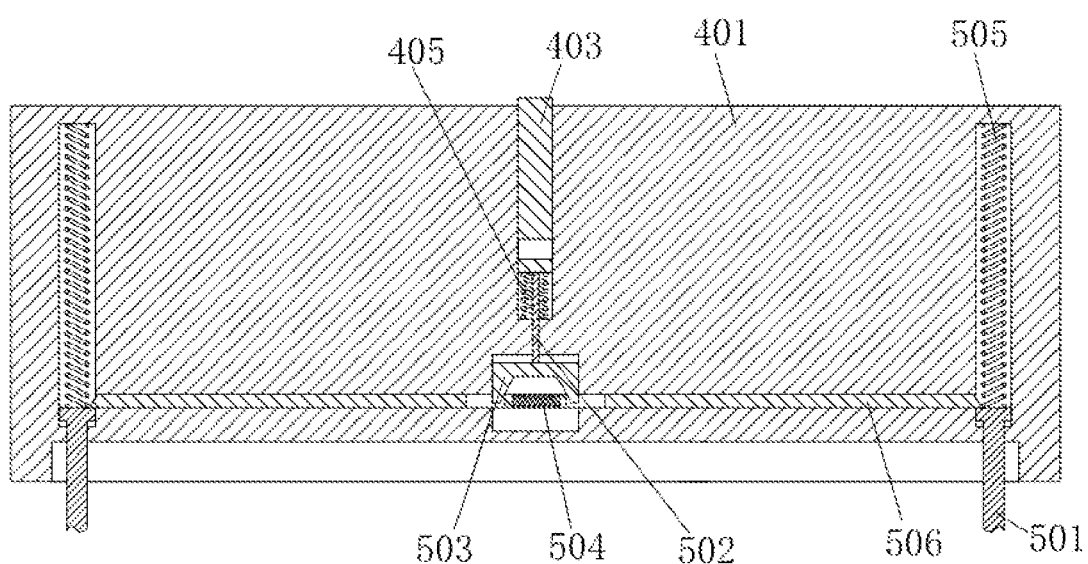
FIG. 8 is a structural diagram of connection between the accommodating box and a support frame according to the present invention.

As shown in FIGS. 1-8, a storage device for a data analyzer for aerospace magnetic field measurement according to the present invention comprises a storage box body 1, a moving structure 2 for facilitating movement is connected to the storage box body 1, a shielding structure 3 for shielding sunlight is connected to the storage box body 1, an accommodating structure 4 for accommodating an article is connected to the storage box body 1, a support structure 5 for supporting is connected to the accommodating structure 4, and a placing structure 6 for placing is connected to the storage box body 1.

The shielding structure 3 comprises fixed shafts 306, a pair of fixed shafts 306 are rotatably connected to a box cover end of the storage box body 1, rotating rods 303 are fixedly connected to the fixed shafts 306, a first torsional spring 305 is butted between the rotating rods 303 and a box cover of the storage box body 1, a fixed frame 302 is slidably connected to one end of the pair of rotating rods 303, a sun visor 301 is fixedly connected to the fixed frame 302, a control block 304 is slidably connected to the box cover end of the storage box body 1, a first spring 308 is fixedly connected between the control block 304 and the box cover of the storage box body 1, a ratchet wheel 307 is fixedly connected to the fixed shaft 306 close to one end of the control block 304, a pawl 309 is rotatably connected inside the box cover of the storage box body 1, a second torsional spring 310 is butted between the pawl 309 and the storage box body 1, the pawl 309 butts the ratchet wheel 307, a butting shaft 311 is fixedly connected to one end of the pawl 309, and one end of the control block 304 butts the butting shaft 311; the control block 304 takes an "L"-shaped structure, and one end of the control block 304 butting the butting shaft 311 takes a beveled shape; the box cover of the storage box body 1 is opened, the fixed frame 302 is turned outwards to drive the rotating rods 303 and the fixed shafts 306 to rotate, the sun visor 301 will screw out, the first torsional spring 305 will be compressed, the fixed shafts 306 will drive the ratchet wheel 307 to rotate, and the pawl 309 limits one-way rotation of the ratchet wheel 307 under the push of the second torsional spring 310, thus preventing the rotating rods 303 from rotating under the push of the first torsional spring 305 and retracting to the interior of the box cover of the storage box body 1; the angle of the sun visor 301 can be adjusted according to needs; the fixed frame 302 is pulled outwards, the fixed frame 302 is slidably connected to one end of the rotating rods 303, so that a protrusion position of the sun visor 301 can be adjusted; and when the sun visor 301 is not needed, the control block 304 is pressed, the first spring 308 will be compressed, a beveled end of the control block 304 will push the butting shaft 311 to move away from the ratchet wheel 307 direction, thus driving the pawl 309 and the ratchet wheel 307 to disengage, the second torsional spring 310 will be compressed, and the first torsional spring 305 will drive the rotating rods 303 to rotate, thus driving the fixed frame 302 and the sun visor 301 to reset to the interior of the box cover of the storage box body 1.

Specifically, the moving structure 2 comprises universal wheels 201, a plurality of universal wheels 201 are mounted on a bottom end of the storage box body 1, and handles 202 are mounted on both ends of the storage box body 1. In the handling process, two persons cooperate to grasp the handles 202 at both ends of the storage box body 1 so as to carry the storage box body from a vehicle, and the universal wheels 201 facilitate the movement on a flat ground.

Specifically, the placing structure 6 comprises support feet 601, a pair of support feet 601 are rotatably connected inside both ends of the storage box body 1, a control rod 605 is slidably connected inside both ends of the storage box body 1, a connecting rod 604 is rotatably connected between the control rod 605 and the support feet 601, a toggle block 602 is fixedly connected at a top end of the control rod 605, the toggle block 602 is slidably connected to the storage box body 1, a fourth spring 606 is fixedly connected between the toggle block 602 and the storage box body 1, a clamping block 603 is respectively slidably connected at both ends of the storage box body 1, a fifth spring 607 is fixedly connected between the clamping blocks 603 and the storage box body 1, a clamping groove 608 is provided at a top end of the toggle block 602, and the clamping blocks 603 can be in clamping connection with the toggle block 602 via the clamping groove 608; the control rod 605 takes a "T"-shaped structure, and one end of the toggle block 602 protrudes from a side wall of the storage box body 1; when it is required to store the data analyzer, the storage box body 1 is lifted, the clamping blocks 603 at both ends of the storage box body 1 are pressed, the fifth spring 607 will be compressed, the clamping blocks 603 will disengage from the clamping groove 608 on the toggle block 602, the compressed fourth spring 606 will push the toggle block 602 to move downwards, the toggle block 602 will push the "T"-shaped control rod 605 to move downwards, so that the connecting rod 604 is driven to push the support feet 601 to unscrew towards outside of the storage box body 1; the storage box body 1 is placed on the ground, bottom ends of the support feet 601 will butt the ground, so that the storage box body 1 is supported, thus facilitating the placement on uneven ground and playing a certain function of isolating from the ground; and when it is required to move via the universal wheels 201, the storage box body 1 is lifted, the toggle block 602 is toggled upwards to drive the control rod 605 to move upwards, the connecting rod 604 pulls the support feet 601 to rotate and be accommodated into inside the storage box body 1, the fourth spring 606 will be compressed, the clamping blocks 603 will enter inside the clamping groove 608 to limit the toggle block 602, so that the storage box body 1 can be lowered and can move via the universal wheels 201.

Specifically, the accommodating structure 4 comprises an accommodating box 401, one end of the storage box body 1 is slidably connected to the accommodating box 401, one end of the accommodating box 401 is slidably connected to a limiting rod 403, a second spring 405 is fixedly connected between the limiting rod 403 and the accommodating box 401, one end of the storage box body 1 close to the accommodating box 401 is provided with a limiting groove 404, one end of the accommodating box 401 is rotatably connected to a pull block 402, and one end of the pull block 402 butts one end of the limiting rod 403; one end of the limiting rod 403 takes a beveled shape, and the limiting rod 403 can butt the storage box body 1 via the limiting groove 404; the pull block 402 is turned outwards, the pull block 402 will push the limiting rod 403 to move downwards, the second spring 405 will be compressed, the top end of the limiting rod 403 will disengage from the limiting groove 404, and the accommodating box 401 can be pulled out by pulling the accommodating box 401 outwards; and a measuring tool can be placed inside the accommodating box 401, the pull block 402 is released, and the limiting rod 403 is reset under the push of the second spring 405.

Specifically, the support structure 5 comprises a support frame 501, one end of the accommodating box 401 is slidably connected to the support frame 501, a pair of tension springs 505 are fixedly connected between the support frame 501 and the accommodating box 401, a push rod 502 is fixedly connected to a bottom end of the limiting rod 403, the push rod 502 is slidably connected to the accommodating box 401, a bottom end of the push rod 502 is fixedly connected to a push block 503, the push block 503 is slidably connected to the accommodating box 401, one end of the accommodating box 401 close to the fixed frame 302 is slidably connected to a pair of locking rods 506, a third spring 504 is fixedly connected between the pair of locking rods 506, the push block 503 penetrates through the locking rods 506, the push block 503 butts the locking rods 506, and one end of the locking rods 506 butts the support frame 501; one end of the locking rods 506 close to the support frame 501 takes a beveled shape, the support frame 501 takes the shape of "⌐"; the push block 503 takes the shape of "⊥", and one end of the push block 503 butting the locking rods 506 takes a beveled shape; the support frame 501 is pulled downwards, so that the bottom end of the support frame 501 butts the ground, and the tension springs 505 will extend; when the support frame 501 is pulled to the bottom end and is lower than the locking rods 506 to disengage, the third spring 504 will push the locking rods 506 to protrude, so that the support frame 501 is limited to retract to the interior of the accommodating box 401, thus supporting the accommodating box 401 and preventing the storage box body 1 from toppling due to unstable center of gravity resulting from the excessively heavy accommodating box 401; and when the accommodating box 401 is retracted, the pull block 402 is turned outwards, and when the pull block 402 pushes the limiting rod 403 to move downwards, the limiting rod 403 will push the push rod 502 to move downwards, thus driving the "⌐"-shaped push block 503 to move downwards, the beveled end of the push block 503 pushes a pair of locking rods 506 to move towards each other, the third spring 504 will be compressed, the locking rods 506 and the support frame 501 disengage, and the tension springs 505 draw the support frame 501 into the interior of the accommodating box 401, so that the accommodating box 401 can be pushed into the interior of the storage box body 1.

When the present invention is in use, firstly, in the handling process, two persons cooperate to grasp the handles 202 at both ends of the storage box body 1 so as to carry the storage box body from a vehicle, and the universal wheels 201 facilitate the movement on a flat ground. When it is required to store the data analyzer, the storage box body 1 is lifted, the clamping blocks 603 at both ends of the storage box body 1 are pressed, the fifth spring 607 will be compressed, the clamping blocks 603 will disengage from the clamping groove 608 on the toggle block 602, the compressed fourth spring 606 will push the toggle block 602 to move downwards, the toggle block 602 will push the "T"-shaped control rod 605 to move downwards, so that the connecting rod 604 is driven to push the support feet 601 to unscrew towards outside of the storage box body 1; the storage box body 1 is placed on the ground, bottom ends of the support feet 601 will butt the ground, so that the storage box body 1 is supported, thus facilitating the placement on uneven ground and playing a certain function of isolating from the ground; and when it is required to move via the universal wheels 201, the storage box body 1 is lifted, the toggle block 602 is toggled upwards to drive the control rod 605 to move upwards, the connecting rod 604 pulls the support feet 601 to rotate and be accommodated into inside the storage box body 1, the fourth spring 606 will be compressed, the clamping blocks 603 will enter inside the clamping groove 608 to limit the toggle block 602, so that the storage box body 1 can be lowered and can move via the universal wheels 201. The box cover of the storage box body 1 is opened, the fixed frame 302 is turned outwards to drive the rotating rods 303 and the fixed shafts 306 to rotate, the sun visor 301 will screw out, the first torsional spring 305 will be compressed, the fixed shafts 306 will drive the ratchet wheel 307 to rotate, and the pawl 309 limits one-way rotation of the ratchet wheel 307 under the push of the second torsional spring 310, thus preventing the rotating rods 303 from rotating under the push of the first torsional spring 305 and retracting to the interior of the box cover of the storage box body 1; the angle of the sun visor 301 can be adjusted according to needs; the fixed frame 302 is pulled outwards, the fixed frame 302 is slidably connected to one end of the rotating rods 303, so that a protrusion position of the sun visor 301 can be adjusted; and when the sun visor 301 is not needed, the control block 304 is pressed, the first spring 308 will be compressed, a beveled end of the control block 304 will push the butting shaft 311 to move away from the ratchet wheel 307 direction, thus driving the pawl 309 and the ratchet wheel 307 to disengage, the second torsional spring 310 will be compressed, and the first torsional spring 305 will drive the rotating rods 303 to rotate, thus driving the fixed frame 302 and the sun visor 301 to reset to the interior of the box cover of the storage box body 1. The pull block 402 is turned outwards, the pull block 402 will push the limiting rod 403 to move downwards, the second spring 405 will be compressed, the top end of the limiting rod 403 will disengage from the limiting groove 404, and the accommodating box 401 can be pulled out by pulling the accommodating box 401 outwards; and a measuring tool can be placed inside the accommodating box 401, the pull block 402 is released, and the limiting rod 403 is reset under the push of the second spring 405. The support frame 501 is pulled downwards, so that the bottom end of the support frame 501 butts the ground, and the tension springs 505 will extend; when the support frame 501 is pulled to the bottom end and is lower than the locking rods 506 to disengage, the third spring 504 will push the locking rods 506 to protrude, so that the support frame 501 is limited to retract to the interior of the accommodating box 401, thus supporting the accommodating box 401 and preventing the storage box body 1 from toppling due to unstable center of gravity resulting from the excessively heavy accommodating box 401; and when the accommodating box 401 is retracted, the pull block 402 is turned outwards, and when the pull block 402 pushes the limiting rod 403 to move downwards, the limiting rod 403 will push the push rod 502 to move downwards, thus driving the "⌐"-shaped push block 503 to move downwards, the beveled end of the push block 503 pushes a pair of locking rods 506 to move towards each other, the third spring 504 will be compressed, the locking rods 506 and the support frame 501 disengage, and the tension springs 505 draw the support frame 501 into the interior of the accommodating box 401, so that the accommodating box 401 can be pushed into the interior of the storage box body 1.

It will be evident to those skilled in the art that the present invention is not limited to the details of the foregoing illustrative embodiments, and that the present invention may be embodied in other specific forms without departing from the spirit or essential features thereof. Therefore, the embodiments should be viewed as exemplary and non-limiting from either point of view, and the scope of the present invention is limited by the appended claims rather than the foregoing description, and all changes which come within the meaning and range of equivalency of the claims are to be embraced therein. Any reference numerals in the claims should not be construed as limiting the claim concerned.

In addition, it should be appreciated that while the present invention has been described in terms of embodiments, not every embodiment includes a single technical scheme, and that this description is provided for clarity only, so that those skilled in the art should view the description as a whole, and technical schemes in various embodiments may be appropriately combined to form other embodiments that can be understood by those skilled in the art.

What is claimed is:

1. A storage device for a data analyzer for aerospace magnetic field measurement, comprising a storage box body, wherein a moving structure for facilitating movement is connected to the storage box body, a shielding structure for shielding sunlight is connected to the storage box body, an accommodating structure for accommodating an article is connected to the storage box body, a support structure for supporting is connected to the accommodating structure, and a placing structure for placing is connected to the storage box body;

the shielding structure comprises a pair of fixed shafts, the pair of fixed shafts are rotatably connected to a box cover end of the storage box body, a pair of rotating rods are fixedly connected to the pair of fixed shafts, a first torsional spring is butted between the pair of rotating rods and a box cover of the storage box body, a fixed frame is slidably connected to one end of the pair of rotating rods, a sun visor is fixedly connected to the fixed frame, a control block is slidably connected to the box cover end of the storage box body, a first spring is fixedly connected between the control block and the box cover of the storage box body, a ratchet wheel is fixedly connected to one of the pair of fixed shafts close to one end of the control block, a pawl is rotatably connected inside the box cover of the storage box body, a second torsional spring is butted between the pawl and the storage box body, the pawl butts the ratchet wheel, a butting shaft is fixedly connected to one end of the pawl, and one end of the control block butts the butting shaft;

the accommodating structure comprises an accommodating box, one end of the storage box body is slidably connected to the accommodating box, one end of the accommodating box is slidably connected to a limiting rod, a second spring is fixedly connected between the limiting rod and the accommodating box, one end of the storage box body close to the accommodating box is provided with a limiting groove, one end of the accommodating box is rotatably connected to a pull block, and one end of the pull block butts one end of the limiting rod;

the support structure comprises a support frame, one end of the accommodating box is slidably connected to the support frame, a pair of tension springs are fixedly connected between the support frame and the accommodating box, a push rod is fixedly connected to a bottom end of the limiting rod, the push rod is slidably connected to the accommodating box, a bottom end of the push rod is fixedly connected to a push block, the push block is slidably connected to the accommodating box, one end of the accommodating box close to the fixed frame is slidably connected to a pair of locking rods, a third spring is fixedly connected between the pair of locking rods; the push block penetrates through the pair of locking rods, the push block butts the pair of locking rods, and one end of the pair of locking rods butts the support frame; and one end of the pair of locking rods close to the support frame takes a beveled shape, and the support frame takes the shape of "⌐".

2. The storage device according to claim 1, wherein the control block takes an "L"-shaped structure, and one end of the control block butting the butting shaft takes a beveled shape.

3. The storage device according to claim 1, wherein the moving structure comprises a plurality of universal wheels, the plurality of universal wheels are mounted on a bottom end of the storage box body, and handles are mounted on both ends of the storage box body.

4. The storage device according to claim 1, wherein the placing structure comprises a pair of support feet, the pair of support feet are rotatably connected inside both ends of the storage box body, a control rod is slidably connected inside both ends of the storage box body, a connecting rod is rotatably connected between the control rod and the pair of support feet, a toggle block is fixedly connected at a top end of the control rod, the toggle block is slidably connected to the storage box body, a fourth spring is fixedly connected between the toggle block and the storage box body, clamping blocks are respectively slidably connected at both ends of the storage box body, a fifth spring is fixedly connected between the clamping blocks and the storage box body, a clamping groove is provided at a top end of the toggle block, and the clamping blocks are configured to be in clamping connection with the toggle block via the clamping groove.

5. The storage device according to claim 4, wherein the control rod takes a "T"-shaped structure, and one end of the toggle block protrudes from a side wall of the storage box body.

6. The storage device according to claim 1, wherein one end of the limiting rod takes a beveled shape, and the limiting rod is configured to butt the storage box body via the limiting groove.

7. The storage device according to claim 1, wherein the push block takes the shape of "⌐", and one end of the push block butting the pair of locking rods takes a beveled shape.

* * * * *